(12) United States Patent
Corrigan et al.

(10) Patent No.: US 7,296,120 B2
(45) Date of Patent: Nov. 13, 2007

(54) MECHANISM THAT PROVIDES EFFICIENT MULTI-WORD LOAD ATOMICITY

(75) Inventors: Michael Joseph Corrigan, Rochester, MN (US); Timothy Joseph Torzewski, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 10/992,436

(22) Filed: Nov. 18, 2004

(65) Prior Publication Data

US 2006/0106994 A1     May 18, 2006

(51) Int. Cl.
*G06F 12/00* (2006.01)
(52) U.S. Cl. .................. 711/144; 711/156; 703/26; 703/27; 712/22; 712/24
(58) Field of Classification Search .............. None
See application file for complete search history.

(56) References Cited

U.S. PATENT DOCUMENTS

| | | | | |
|---|---|---|---|---|
| 6,360,194 | B1* | 3/2002 | Egolf | 703/26 |
| 6,728,846 | B2* | 4/2004 | Noyes | 711/156 |
| 6,922,666 | B2* | 7/2005 | Noyes | 703/26 |
| 2004/0163083 | A1* | 8/2004 | Wang et al. | 718/102 |

* cited by examiner

*Primary Examiner*—Hyung Sough
*Assistant Examiner*—Kaushik Patel
(74) *Attorney, Agent, or Firm*—Steven W. Roth; Roy W. Truelson

(57) ABSTRACT

Disclosed is an apparatus, method, and program product that provides atomic, multi-word load support without incurring additional memory utilization. A double-word is atomically loaded without the use of one or more additional fields and without a lock. An invalidity marker is used in connection with a cache miss time to ascertain whether a loaded double-word has been stored and loaded atomically, and is thus, valid.

7 Claims, 4 Drawing Sheets

MECHANISM THAT PROVIDES EFFICIENT MULTI-WORD LOAD ATOMICITY

FIELD OF THE INVENTION

The present invention relates to multi-word atomicity for load operations of a computer system.

BACKGROUND OF THE INVENTION

Computer systems are widely used to store and manipulate data. Data is stored in computer system memory and manipulated by computer system programs executing on the computer system's processor. As is well known, a processor is often thought of as the "brains" of the computer system because it is the component within the computer system that executes the computer system's programs, allowing the computer system to do real work. Memory is used to hold computer programs while they are being executed by the processor, and to hold information (data) for access by the processor executing the computer programs.

One of the fundamental characteristics of a processor is its word-size. A processor's word size is usually the same as the width of the processor's registers, which are the local storage areas used to perform arithmetic and logical operations. When a computer system is described as being a 32-bit or a 64-bit computer, this is really a reference to the processor's word-size. Thus, when a processor performs an operation on behalf of a computer system or other device, it does so based upon its word-size. While processors are capable of performing many different operations, two of the most-used operations involve retrieving data from memory (i.e., the load operation) into its registers and placing data into memory (i.e., the store operation).

Implied within the notion of a load or a store operation is the notion of atomicity. Atomicity is basically just an assurance that an operation either completes entirely or not at all. Thus, when a load or a store operation executes on a processor, the processor enforces atomicity for the particular word being operated upon by the load or the store operation. Said another way, the processor ensures that the word is not partially loaded into a register or partially stored into memory. The problem addressed by this patent pertains to the need to atomically load more than one word.

Other existing solutions to the problem of atomically loading multiple words include requiring a lock to be held while loading and storing the multiple words, or using another memory word as a count field.

For the count field solution, before loading each word of the multi-word data, the count field must also be loaded and examined. Then, after the multi-word data is loaded, the count field is loaded and examined again. If the count in the count field has changed (the store code increments the count at the start and end of the store sequence), the load fails and must be attempted again.

The "lock" solution is undesirable because of the performance cost of acquiring and releasing the lock for each load. The count field solution is undesirable because the additional memory space requirements of the count field and the complexity involved with associating count fields with pre-defined word groupings.

Therefore, a need exists for efficient and atomic multi-word support that exceeds that provided by built-in processor capability.

SUMMARY OF THE INVENTION

The present invention involves an apparatus, method, and program product which provides atomic, multi-word load support without incurring additional memory expense or the cost of getting a lock. In the preferred embodiment, a double-word is atomically loaded without the use of a lock and without the use of one or more additional fields. At a high level, this is accomplished through two cooperative steps. First, during the store, an invalidity marker is placed into one of the words of the to-be-stored double-word. After storing the other word, of the double-word value, the invalidity marker is overwritten by the second part of the double-word value. Then, on the load, the double-word is checked for the invalidity marker, along with consideration of an elapsed time value. If the invalidity marker does not appear in the double-word and the elapsed time does not exceed a predetermined threshold, the load operation is known to have been atomic. The predetermined time threshold must be less than the minimum time to process a cache miss and less than the minimum time to process a task switch (whichever is less).

DESCRIPTION OF THE PREFERRED EMBODIMENT

Figure 1:
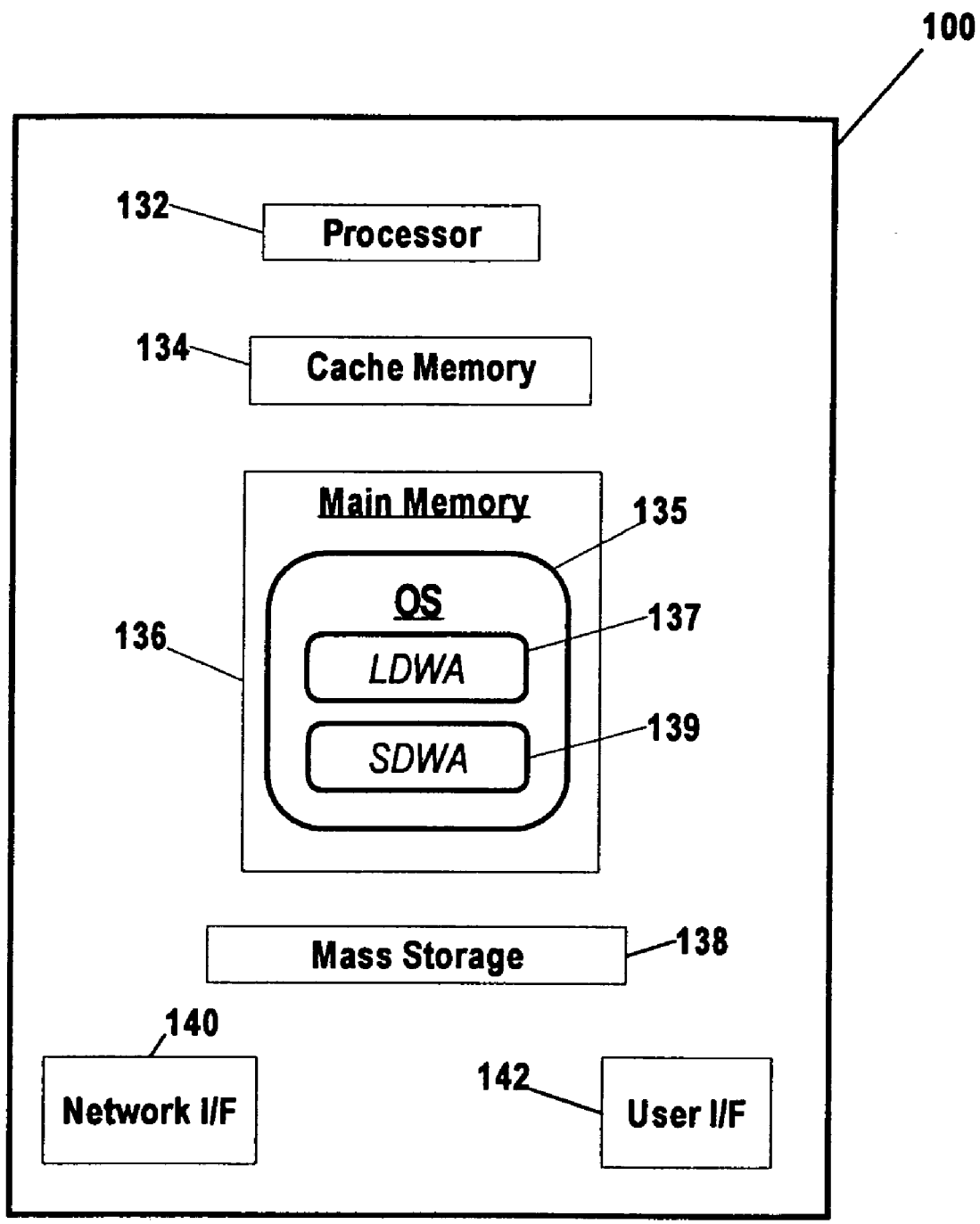
FIG. 1 is a block diagram showing a computing environment that is capable of supporting the preferred embodiment of the present invention.

Turning now to the drawings, FIG. 1 shows some of the operational components used in the computing environment of the preferred embodiment of the present invention. Computer system 100 is an enhanced IBM iSeries computer system, although other computer systems could be used. Depicted components include Processor 132, Cache Memory 134, Main Memory 136, Mass Storage 138, Network Interface 140, and User Interface 142. Processor 132 is an enhanced Power PC processor used in iSeries computer systems. Processor 132 includes 64-bit registers (not shown). It should be noted that while a single processor is used in the preferred embodiment to explain the benefits and advantages of the present invention, a multi-processor configuration could also have been used. Cache Memory 134 is used in the conventional way, as fast access memory for Processor 132. Main Memory 136 is also used in the preferred embodiment in the conventional manner. Mass Storage 138 is used in FIG. 1 to represent one or more secondary storage devices such as magnetic or optical media. Network interface 140 is used to communicate with other computer systems, while User Interface 142 is used to accept commands and relay information to the one or more users of Computer System 100.

Shown within Main Memory 136 is Operating System 135. Operating System 135 is an enhanced version of IBM i5/OS, although other operating systems could be used. Shown within Operating System 135 is Load Double-Word Atomic (LDWA) 137 and Store Double-Word Atomic (SDWA) 139. These two facilities are respectively explained, in detail, in the text associated with FIGS. 3 and 4.

As a final preliminary matter, it should be understood that while the embodiments of the present invention are being described herein in the context of a complete system, certain program mechanisms, such as Kernel Services 137, are capable of being distributed in program product form. Of course, a program product can be distributed using different types of signal bearing media, including, but not limited to: recordable-type media such as floppy disks, CD ROMs, and memory sticks; and transmission-type media such as digital and analog communications links.

Figure 2:
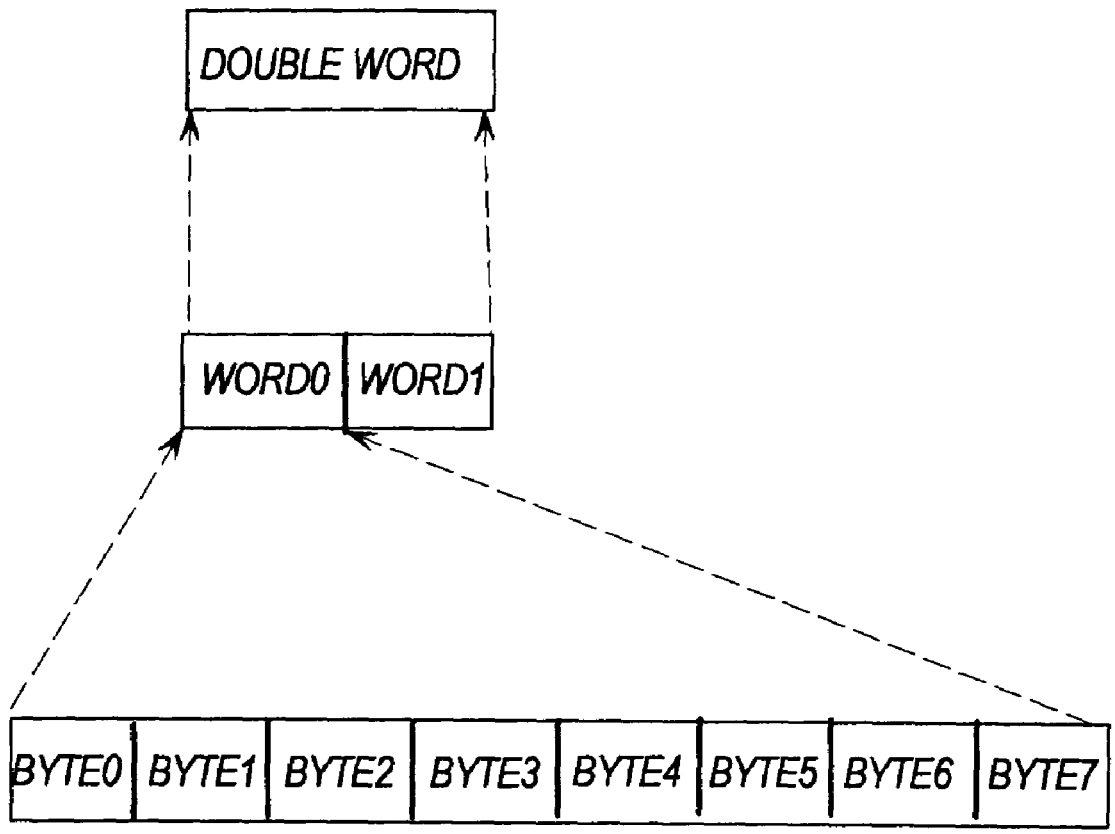
FIG. 2 is a block diagram showing the breakdown of the double-word used in the preferred embodiment of the present invention.

FIG. 2 is a block diagram showing the breakdown of the double-word of the preferred embodiment. As shown, each word of the preferred embodiment is eight bytes in length, and conventionally, each byte is eight bits in length. A double-word, shown in FIG. 2 as comprising WORD0 and WORD1, is made up of sixteen bytes (i.e., 128 bits).

Figure 3:
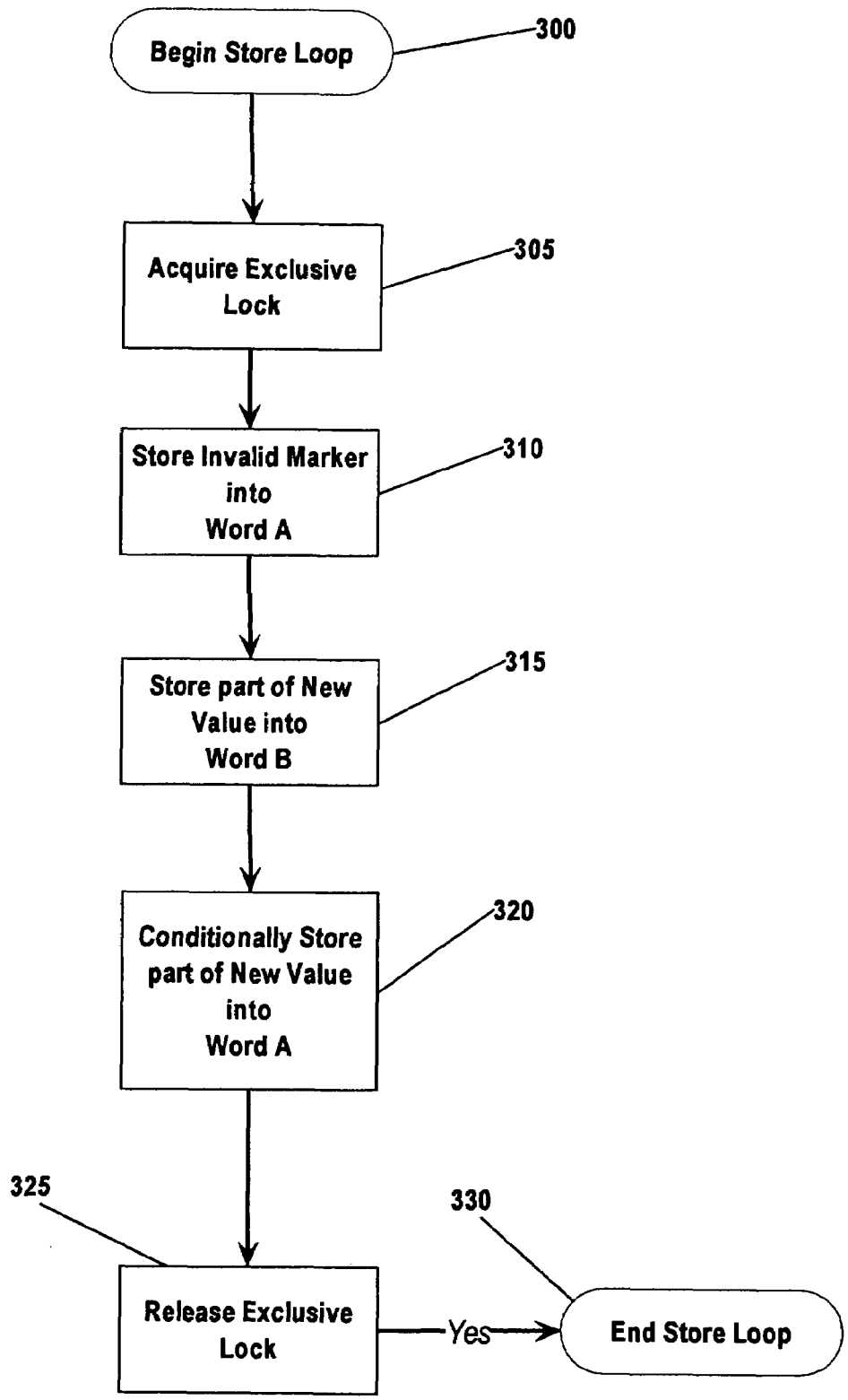
FIG. 3 is a flow diagram showing highlighted steps used to carry out the Load Double-Word Atomic facility of the preferred embodiment.

FIG. 3 is a flow diagram showing steps used in the preferred embodiment to perform an atomic double-word store. When a program executing on Processor 132 needs to atomically store a double-word from Main Memory 136, it invokes SDWA 139 of Operating System 135. As part of the process of calling SDWA 139, the calling program specifies the double-word which is to be stored. In the preferred embodiment, the two words of the double-word are stored contiguously in Main Memory 136, but the scope of the present invention is not limited to such an arrangement.

In block 305, SDWA 139 acquires an exclusive lock which allows only one thread of execution within SDWA 139 at a time. An invalidity marker is then stored in Word A [block 310]. In the preferred embodiment, the invalidity marker is application dependent, meaning that the executing program uses a value it understands to be invalid. Then, in block 315, one word of the to-be-stored double-word is stored into Main Memory 136 (shown as Word B). Next, SDWA 139 stores the other word of the new value into Word A [block 320]. The exclusive lock is released [block 325] and SDWA 139 completes its processing in block 330. Note that the invalidity marker is used to invalidate a load, which is explained in more detail in the text associated with FIG. 4.

Figure 4:
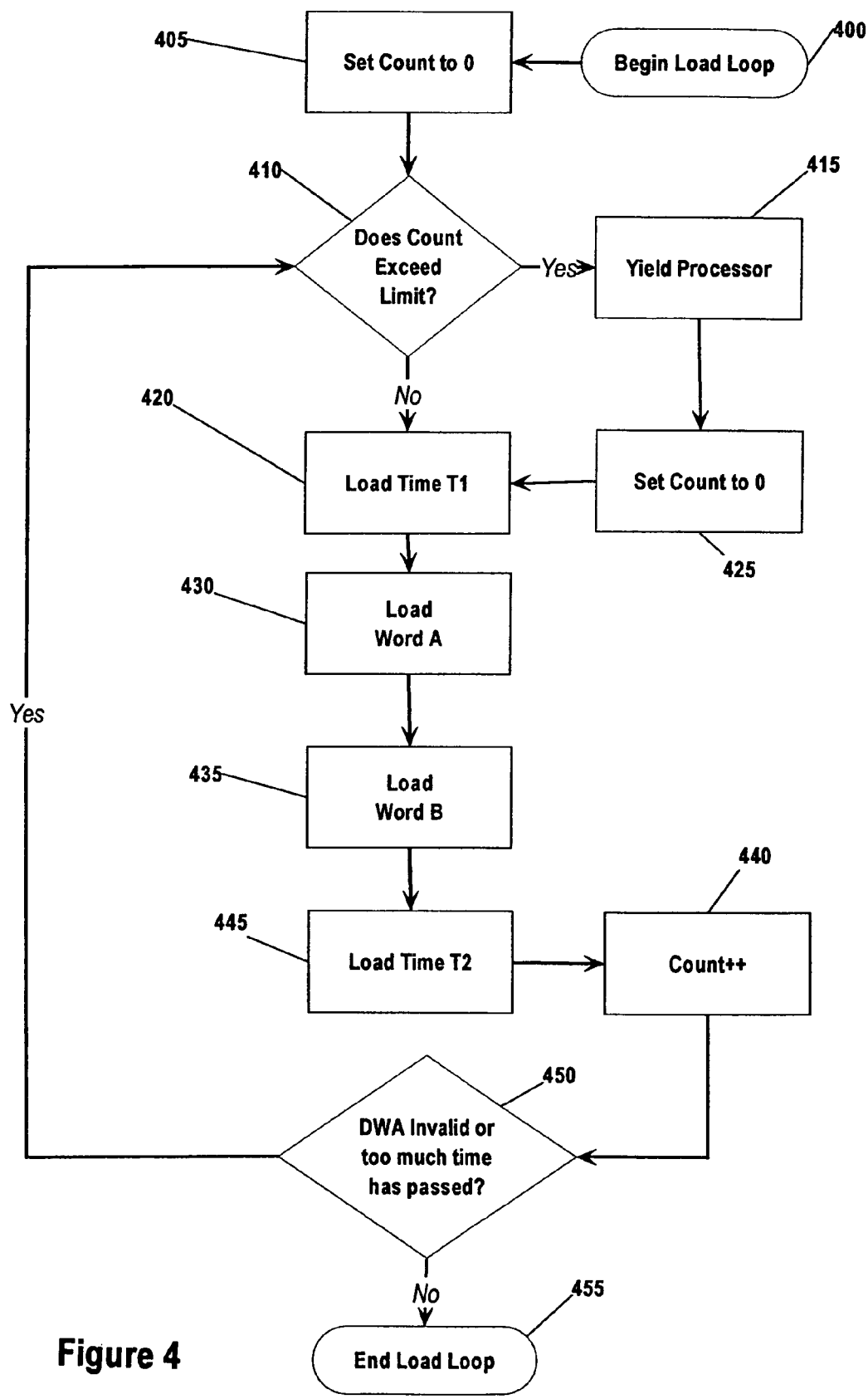
FIG. 4 is a flow diagram showing highlighted steps used to carry out the Store Double-Word Atomic facility of the preferred embodiment.

FIG. 4 is a flow diagram showing steps used in the preferred embodiment to perform an atomic double-word load. When a program executing on Processor 132 needs to atomically load a double-word from Main Memory 136, it invokes LDWA 137 of Operating System 135.

As part of the process of calling LDWA 137, the calling program specifies the double-word which is to be loaded. In the preferred embodiment, the two words of the double-word are contiguous in Main Memory 136, but the scope of the present invention is not limited to such an arrangement. In block 405, a load counter is set to 0. This is done in the preferred embodiment to limit the number of times LDWA 137 will run without yielding the processor. The counter removes contention over the same double-word. Said another way, the counter is used to avoid the case where SDWA 139 cannot complete because LDWA 137 always has the processor and LDWA 137 cannot complete because the value stored in the double-word is never valid. In block 410, the count is checked against a count limit. In the preferred embodiment the count limit is seven (7), although other values could be used. Naturally, the count will not be exceeded the first time through the steps of LDWA 137, or just after Processor 132 has been yielded (see block 425). However, in cases where the count is exceeded, Processor 132 is yielded in block 415 via an interface to Operating System 135 (not shown). The count is then set to zero in block 425.

Regardless of whether the count has been exceeded, LDWA 137 loads a time (T1), again via an interface of Operating System 135. In the preferred embodiment the time is loaded directly from the processor hardware with a single instruction, although any method that can retrieve a time in considerably less than the time for a cache miss could be used. Word A of the double-word is then loaded in block 430 and Word B of the double-word is then loaded in block 445. (Note here that the implementation of LDWA 137 of the preferred embodiment assumes that that Processor 132 executes instructions (blocks 420 through 445) in strict order. Some processors work differently and permit reordering of instructions, in which case additional logic would be required.) These steps are followed by the loading of another time value (T2) in block 445. The count is then incremented in block 440.

In block 450, the validity of the loaded double-word is checked. In the preferred embodiment, there are two pre-conditions to validity. First, the value stored in Word A must not be equal to the invalidity marker (see FIG. 3 and the associated text). Second, the difference between the loaded time values (i.e., T1 and T2) must not be greater than a predetermined amount. If the value stored in Word A is equal to the invalidity marker, it is understood that at least one word of the stored double-word is invalid. (Note here that those skilled in the art will appreciated that the invalidity marker could be stored/checked in either word of the double word.) If the difference between times T1 and T2 is greater than the time needed to process a cache miss or the time to process a task switch (whichever is smaller), then it is possible that an interfering store may have occurred. By possible "interfering store" we mean that it is possible another store to one of the words occurred during the double-word load, meaning that the to-be-loaded double-word may no longer be valid. The cache miss and task switch times are implementation dependent. If either of these two pre-conditions are not satisfied, LDWA 139 of the preferred embodiment considers the double-word load to have failed, and proceeds to block 410 to attempt anew to atomically load the double-word at issue. If the two pre-conditions are satisfied, LDWA 139 completes its processing in block 455.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. For instance, while the present invention has been described in the context of a facility for performing atomic operations on word aggregates that exceed the size of native processor support, the concepts could be applied to an overall locking scheme as well. Thus, the description as set forth is not intended to be exhaustive or to limit the invention to the precise form disclosed. Many modifications and variations are possible in light of the above teaching without departing from the spirit and scope of the following claims.

What is claimed is:

1. A computer apparatus, said computer apparatus comprising:
   a processor, said processor being used to execute instructions, said processor atomically executing single-word load instructions and single-word store instructions; and
   memory, said memory being used to contain data and said instructions, memory also containing a facility to atomically load double-word data from said memory for use by said processor without utilizing memory space in addition to memory space associated with said double-word data;

wherein said facility to atomically load said double word data utilizes a cache miss time to ensure atomicity during loading of said double word data.

2. The computer system of claim 1 wherein said memory also contains a facility to atomically store said double word data into said memory.

3. The computer system of claim 2 wherein an invalidity marker is stored in one word of said double-word data by said facility to atomically store said double word data.

4. The computer system of claim 3 wherein said invalidity marker is used by said facility to atomically load said double word data to ensure atomicity during loading of said double word data.

5. A computer-implemented method, said method comprising the steps of:

receiving a request to atomically load double-word data from memory;

loading a first word of said double-word data;

loading a second word of said double-word data, said second word of said double-word data being atomically loaded without utilizing memory space in addition to said double-word data;

determining an elapsed time for performing said steps of loading a first word of said double-word data and loading a second word of said double-word data;

comparing said elapsed time to a known threshold; and repeating said loading steps when said elapsed time exceeds said known threshold.

6. The computer implemented method of claim 5 wherein said known threshold is a cache miss time.

7. The computer-implemented method of claim 5 further including the steps of:

checking one of said first word or said second word for an invalidity value; and repeating said loading steps when a value stored in said first word or said second word is equal to said invalidity value.

* * * * *